United States Patent [19]
Richmond

[11] 4,079,274
[45] Mar. 14, 1978

[54] DAMPING OF NOISE

[75] Inventor: James W. Richmond, Charlotte, N.C.

[73] Assignee: General Time Corporation, Thomaston, Conn.

[21] Appl. No.: 742,614

[22] Filed: Nov. 17, 1976

[51] Int. Cl.² .................................... H02K 5/24
[52] U.S. Cl. ..................... 310/51; 310/68 R; 310/156; 310/15
[58] Field of Search ............ 310/51, 156, 162–165, 310/268, 154, 68 R, 49

[56] References Cited
U.S. PATENT DOCUMENTS

| 3,803,433 | 4/1974 | Ingenito | 310/156 |
| 3,840,761 | 10/1974 | Müller | 310/268 X |
| 3,869,627 | 3/1975 | Ingenito et al. | 310/156 X |
| 3,891,905 | 6/1975 | Müller | 310/68 X |
| 3,894,252 | 7/1975 | Miwa et al. | 310/51 |
| 4,011,475 | 3/1977 | Schmider | 310/68 R |

Primary Examiner—Donovan F. Duggan
Attorney, Agent, or Firm—Pennie & Edmonds

[57] ABSTRACT

A slug is disposed adjacent a rotor of an induction type motor. The slug is of a "ferrous" material such that the attraction between it and the magnetic poles of the rotor creates at least side and preferably both side and end loading of opposed ends of the rotor shaft within its supporting bearings. The slug, disposed stationarily in spaced relation to the rotor, is of a length approximately equal to the length of a chord through adjacent magnetic poles. The action of the slug is to reduce bearing rattle in a rotating member.

9 Claims, 4 Drawing Figures

DAMPING OF NOISE

BACKGROUND OF THE INVENTION

The prior art is replete with motors, for example, of the synchronous type which include a rotor having a disc-shaped body including a plurality of permanently magnetized poles of alternately opposite polarity, a stator having a core with at least one pair of spaced-apart stator pole pieces defining an air gap and means for supporting the rotor for rotation within the gap. The supporting means comprises a shaft which, also, may support a drive pinion or other form of input to a mechanical movement, for example, of a timepiece and which, in turn, is supported for rotation in a bearing disposed at or within the region of opposed ends of the shaft. Typical prior art constructions are those illustrated in U.S. Pat. Nos. 3,803,433 to Ingenito and 3,869,627 to Ingenito et al., as well as other pending applications, all of which are assigned to the assignee of the present invention. While these motors have received commercial acceptance and are in widespread use in driving the mechanical movement of a timepiece they have been found by some to suffer from a drawback, namely, they are considered to generate noise at a level which is unacceptable. The noise results from the rattle of a rotating member in a bearing possibly caused by too large a clearance between the end of the shaft and the bearing walls, improper lubrication of the bearing or loss of lubrication through extended use, to name a few reasons. In terms of the total amount of ambient noise the rattling noise, while not great, has been determined the direct cause of many returns of motors used to drive timepieces both in home and automobile applications.

The present invention then is directed to and has as its main object that of improving upon motors such as of the afore-mentioned types as well as others thereby to eliminate or at least substantially reduce this type of generated noise whereby the motors will have better acceptance. While the concept of the present invention is discussed in terms of the combination with a motor, as will become apparent, it has more universal application. Thus, the concept may be used both with wheels and gears, typically formed of "ferrous" material, whereby a stationary magnet is positioned at their edge.

BRIEF DESCRIPTION OF THE PRESENT INVENTION

The present invention is directed to the manner and means of eliminating or at least substantially reducing noise generated by the rattle of a rotating member in a bearing. The present invention specifically is directed to the manner and means of eliminating or at least substantially reducing such noise generated by rotating structure in an inductor motor.

The inductor motor, hereinafter "motor", includes a rotor formed by a disc-shaped body having permanently magnetized poles of alternate opposite polarity, a stator having a core with at least one pair of stator pole pieces located at and on opposite sides of an air gap, and a winding associated with the core for polarizing the stator pole pieces thereby to drive the rotor through the gap. The rotor is carried on and movable conjointly with a shaft whose ends are supported within a bearing fixedly disposed with respect to the casing or housing of the motor. The invention includes in combination with the movable member such as a rotor of a slug of metal disposed within the region of the outer edge of the rotor such that the magnetic axes of at least a pair of adjacent poles pass through a facing surface of the slug. The slug may be positioned at the air gap and at angular positions about the axis of the rotor shaft, as well as in a position that the facing surface is parallel to the surface of rotor and radially outward of the rotor. With the latter, the facing will be concentric to the outer periphery of the rotor. The slug because of the magnetic attraction between it and the rotor poles causes the shaft either to angle slightly within the bearings from the perpendicular as well as to be drawn toward one bearing to create both side and end loading or to be drawn toward the bearings to create side loading. In both the slug serves to eliminate or at least substantially reduce the generation of noise.

The present concept envisions that the slug may be formed on or carried by one of the stator poles at the air gap. It is also envisioned that the slug may be positioned away from the air gap at various angular orientations. Further, the slug may be orientated such that a facing surface is parallel to the surface of the rotor or radially outward of the periphery of the rotor, the spacing being in the range of a few to several thousandths of an inch. It is preferred, however, that the slug be oriented with a facing surface parallel to the surface of the rotor and displaced angularly from the air gap. The spacing will be slightly greater than the spacing of the rotor to the respective stator poles.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may be readily utilized as a basis for the designing of other structures for carrying out the several purposes of the invention. It is important, therefore, that the claims be regarded as including such equivalent construction as do not depart from the spirit and scope of the invention.

DESCRIPTION OF THE PREFERRED EMBODIMENTS

Figure 1:
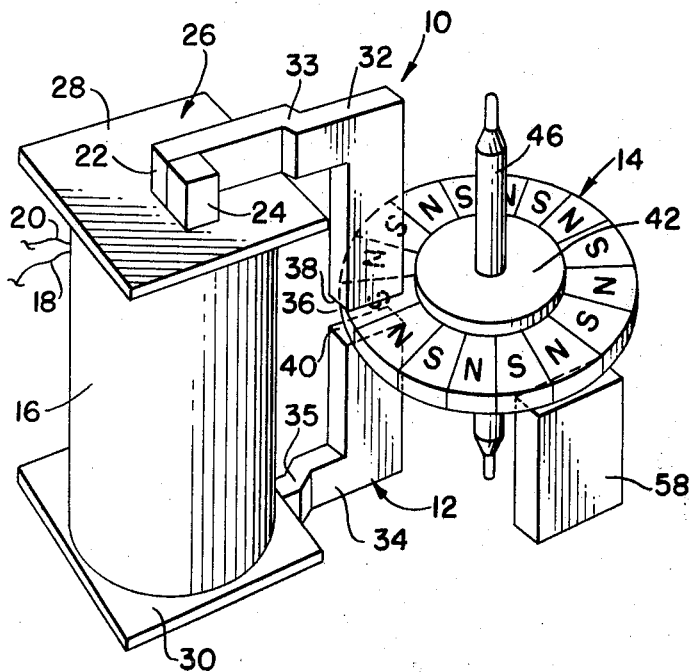
FIG. 1 is a perspective view of the motor of the present invention.
Figure 2:
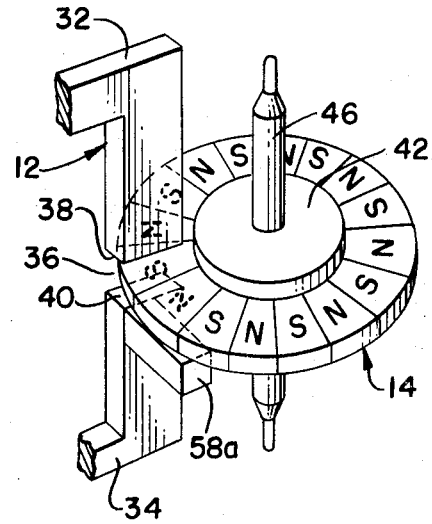
FIGS. 2 and 3 are partial views, also in perspective, illustrating further forms of the invention; and, FIG. 4 is a partial elevational view of the motor illustrating the loading force introduced by the combination with the rotor of a "ferrous" slug.
Figure 3:
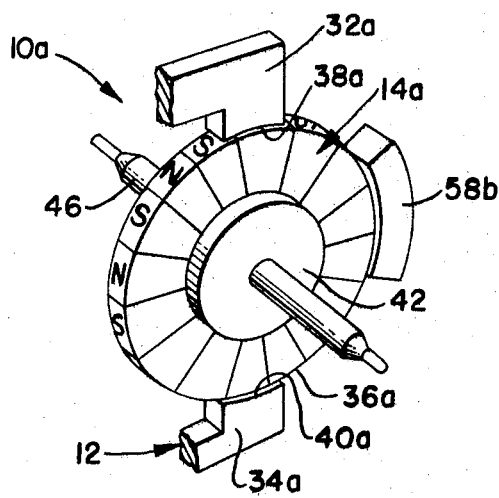

The preferred and other forms of the present invention may be seen in FIGS. 1–3 wherein like structure is denoted by the same identifying numeral. Referring to these figures, the motor 10 includes generally a stator 12 and a rotor 14. The stator is formed by a core (not shown) and an energizing winding 16 is wound therearound. The ends of the winding, shown as 18, 20, are adapted for connection of the winding to a source of current. The source may be the battery (not shown) and the connection may be through an intermediate circuit arrangement, as well known (also not shown).

The core supports a pair of legs 22, 24. The legs extend through the core and support a bobbin 26 for the winding wound concentrically therearound between a pair of spaced flanged ends 28, 30. The winding bobbin may be comprised of any suitable nonconductive material such as a hardened plastic for purposes of providing support and for other purposes as are apparent.

Arms 32, 34 extend from opposite ends of the legs toward an air gap 36 bounded on opposite sides by stator pole faces 38, 40. In the motors of FIGS. 1–3, the stator is illustrated as including a pair of stator poles, this showing being illustrative of the presently preferred form of stator construction. The invention, however, is clearly applicable to motors including two or more pairs of stator poles as may be utilized if development of greater torque is desired, for example.

The legs are positioned in side-by-side relation along their length to increase the cross-sectional area of the magnetic structure to a square configuration. This configuration, as well known, provides a very efficient electromagnetic coupling relationship with the winding 16. The legs may be spot welded or otherwise secured adjacent their ends to form a unitary assembly. The arms 32, 34 throughout their length generally are of the same cross-sectional area or thickness as that of the legs 22, 24 respectively. As illustrated in FIGS. 1 and 2, the pole faces 38, 40 are coextensive one with the other on opposite sides of the air gap 36. To this end, each of the arms between their ends may include a length, the lengths 33, 35, which is oppositely angled. The legs and arms of the stator may be of annealed iron and, preferably, the legs and arms are formed integrally, for example, by a stamping process. The angled length may be formed separately.

The rotor 14 is disc-shaped and formed of a low density material, such as barium ferrite in a rubber binder. A material of this type is sold under the trade name "Plastiform", a product of the Minnesota Mining and Manufacturing Company. The material is relatively inexpensive in the fabrication of rotors of the size herein contemplated or required and has a residual induction value, i.e., retentivity, of about 0.22 webers per meter squared.

Figure 4:
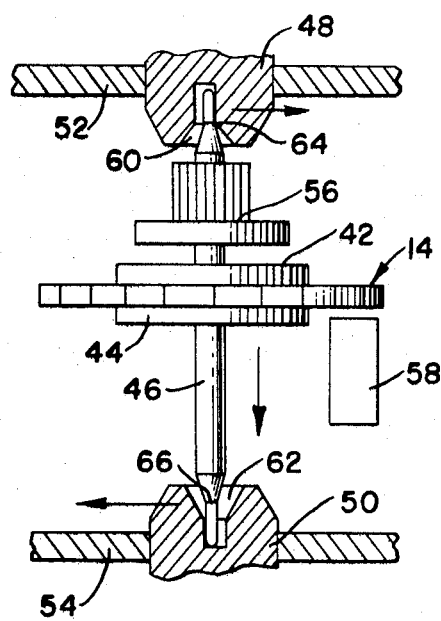

In FIG. 4, a partial view of the preferred motor of FIG. 1, the rotor 14 is illustrated in supported disposition between a pair of discs 42, 44. Each disc is of a diameter less than the diameter of the rotor so that outer annular portion of the rotor is exposed. The outer annular portion of the rotor is permanently magnetized by techniques as are well known thereby to form an annular ring of magnetized areas. These areas or sections, in plan, are of a somewhat truncated triangular outline, contiguous to one another, and of alternately opposite polarity. In the forms of the motor illustrated in the former figures, the rotor sections are magnetized axially in a dipole arrangement whereby the entire outer annular portion is available for generating alternately opposed magnetic fields. It is contemplated that the sections of rotor 14a may be polarized radially (FIG. 3) in which form of the invention the axis of rotation of the rotor will be concentric to the axis through an air gap 36a. In this form of motor 10a, the arms 32a, 34a are of a shorter overall length and terminate in stator pole faces 38a, 40a, whose surfaces are generally concentric to the peripheral surface of rotor 14a.

The rotors 14 and 14a, as well as discs 42, 44, are fixedly mounted, for example, by means of a friction fit, a keyway or otherwise on a shaft 46. These structures, further, are disposed in juxtaposed relation on the shaft, the discs providing support for the rotor over a portion of its area. The discs, also, have the effect of negating or substantially reducing any warping of the rotor because of magnetic attraction between it and the slug, to be discussed. A pair of bearings 48, 50 carried by plates 52, 54 of the housing or casing of the motors support the shaft for rotation with the respective air gaps. A pinion 56 or some other form of output member comprising an input drive to the mechanical movement (not shown) of the timepiece may be similarly fixed for conjoint movement with the shaft.

According to the invention, a slug is positioned adjacent each of the rotors for purposes discussed. In FIG. 1. the slug is identified by the numeral 58 and in FIGS. 2 and 3, illustrating further forms of the invention the slug is identified by the numerals 58a, 58b, respectively. The slugs are configured to present a surface generally perpendicular to the axes of the respective rotor poles. In FIGS. 1 and 2 the slugs are similarly located in relationship to the surface of the rotor 14 yet in the preferred form is removed from the air gap 36 through an angle illustrated as about 90°. Other angular dispositions may be employed equally as well. In FIG. 1, the slug 58 is supported by the housing or casing of the motor (by means not shown); whereas in FIG. 2 the slug 58a may be supported on one of the stator poles, such as the pole of arm 34. In FIG. 3, the slug 58b similarly may be supported by the housing or casing of the motor. The surface of the slugs that cooperate with the respective rotors generally are of like surface area, including a major dimension which is of a length approximately to span two neighboring poles of the rotor. It has been found that a slug having a major dimension to span only about one pole of the rotor must be disposed closer to the plan surface of peripheral surface of the rotor to prevent a bleed or leakage of the flux in the magnetic circuit.

The specifications of motor make-up such as features of the stator 12 are considered important from the standpoint of fabrication of the motor but unimportant in the description and understanding of the invention. To this end, the winding 16 preferably of copper wire may comprise that gauge and include the number of turns as are dictated by factors, such as the total resistance desired, the number of pole pairs of the stator, the operating torque to be obtained, the operating voltage range of the motor and others as may be well known in the motor arts. Further, the optimum surface area of the stator at the pole faces is dictated by various factors, such as the flux leakage at the face poles, the surface area of the rotor poles, the width of the air gap and the unmagnetized transition region between adjacent poles of the rotor, again, among other factors as may be well known.

With the above in mind if, for example, referring to the forms of motor of FIGS. 1 and 2, the spacing between the surface of the rotor and the stator pole face was in the order of approximately 0.011 inches the spacing between that surface and the surface of the slug will be slightly greater. Thus, the spacing may be about 0.012 to about 0.016 inches. If, however, the surface of the slug spans only about one rotor pole the spacing will be slightly less, on the order of about 0.008 to about 0.010 inches.

The use of a slug of the former size is preferred since the spacing is greater and thereby the chance that the magnetic attraction between the rotor and slug will cause warpage is lessened.

Similar orders of spacing may be employed in connection with the form of motor of FIG. 3. It is preferred, also, that the slug be disposed away from the stator by some angular disposition to obviate the occurrence of flux leakage which is possible if the slug is located at the air gap (FIG. 2). And, the use of a slug with an axially polarized rotor is preferred since it is possible to achieve both side and end loading of the moving structure; whereas, in the FIG. 3 form of motor the moving structure is subjected to side loading, only. The amount of movement of the shaft may be about 0.001 to about 0.002 inches sideways from the axis of the bearings and about 0.002 to about 0.004 inches endwise of the bearings.

In each of the forms of motor the slug will comprise a "ferrous" material as, for example, cold rolled steel having a #4 temper.

The bearings 48, 50 support the shaft 46 for movement about an axis which insofar as the form of the motors described is concerned may be either concentric with the stator pole faces (FIG. 3) or perpendicular to the planes including the stator pole faces (FIGS. 1 and 2).

While it is clear that an ultimate degree of precision might be introduced into the several forms of motor herein and, accordingly, by this precision eliminate or substantially reduce the amount of noise generation in the form of bearing rattle, the motors typically found in timepieces of the variety found in an automobile, or for wall mounting, are not precision products although highly reliable in their performance. The illustration in FIG. 4, somewhat exaggerated in clearance dimension, demonstrates the size of opening 60, 62 to accommodate the swaged ends 64, 66 of the shaft 46. Clearance of some order must be provided in the typical mass produced item for ease in fabrication and cost considerations. The large bearing clearance both axially and in the directions normal thereto permits the generation of noise, i.e., bearing rattle, through displacement of the shaft during movement. As indicated, lubrication of the area has the effect of reducing the noise for a period of service but has not been found to provide the desired result as has been achieved by the present invention.

Thus, referring to FIG. 4, the magnetic attraction between the magnetic poles of the rotor and the slug of "ferrous" material (also a rotating "ferrous" member and a stationary permanent magnet) causes the shaft supporting the rotor to undergo both side and end loading in the directions of the arrows. The slug prevents such bearing rattle through chattering movement of the shaft within the bearing during operation of the motor in that the shaft will rotate continuously about an axis displaced from the vertical by an angular amount of about 0.1° to about 0.2°. This displacement of the shaft by the manner and means discussed herein has the effect of achieving the desired end of eliminating or at least substantially reducing to an acceptable level or below noise generated by a chattering or rattling shaft in a bearing.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

Having described the invention, what is claimed is:

1. In combination with a rotor carried by and rotatable with a shaft supported for rotation in a pair of bearings at the shaft ends, loading means positioned in adjacent spaced relation to said rotor, said loading means being formed of a "ferrous" material and said rotor comprising at least a pair of sectors of opposite magnetic polarity whereby there is a mutual attraction therebetween resulting in a loading in said bearings and a slight realignment of the axis of rotation of said shaft, said loading means having a surface which extends throughout at least the length of a chord through adjacent sectors of said rotor, and drive means for rotatably driving said rotor and shaft under conditions such that said loading acts to eliminate or substantially reduce bearing rattle comprising stator means having at least a pair of spaced stator pole pieces defining an air gap therebetween and means for alternately oppositely polarizing said stator pole pieces for driving said rotor through said air gap.

2. The combination of claim 1 wherein said loading means is disposed at said gap.

3. The combination of claim 1 wherein said loading means is disposed in a position angularly removed from said gap.

4. The combination of claim 3 wherein said loading means is disposed at an angle removed from said gap of about 90°.

5. The combination of claim 2 wherein said sectors are polarized as a dipole, and said loading member is disposed whereby a surface thereof is substantially perpendicular to the axes of said dipoles.

6. The combination of claim 2 wherein said magnetic poles are oriented radially of said rotor, and said loading member is disposed radially outwardly of said rotor, said loading member having a surface which is concentric to the peripheral surface of said rotor.

7. The combination of claim 3 wherein said sectors are polarized as a dipole, and said loading member is disposed whereby a surface thereof is substantially perpendicular to the axes of said dipoles.

8. The combination of claim 3 wherein said magnetic poles are oriented radially of said rotor, and said loading member is disposed radially outwardly of said rotor, said loading member having a surface which is concentric to the peripheral surface of said rotor.

9. The combination of claim 7 wherein said loading means is disposed at an angle removed from said gap of about 90°.

* * * * *